United States Patent

Zito

[15] 3,648,596
[45] Mar. 14, 1972

[54] PIZZA-TOPPING APPARATUS

[72] Inventor: Santo Zito, Los Angeles, Calif.

[73] Assignee: DOB Division of Fairmont Foods Co., Los Angeles, Calif.

[22] Filed: Nov. 28, 1969

[21] Appl. No.: 880,879

[52] U.S. Cl..............................99/450.7, 141/134, 425/217, 425/147, 425/449, 425/202
[51] Int. Cl..........................................A21c 9/08
[58] Field of Search..................107/27, 43; 141/131, 134; 222/318

[56] References Cited

UNITED STATES PATENTS

| 1,283,512 | 11/1918 | Herr | 107/43 |
| 2,563,321 | 8/1951 | Dugan | 222/318 X |
| 2,868,357 | 1/1959 | Thomas | 198/220 |
| 2,980,290 | 4/1961 | Fahrni | 222/318 X |
| 3,087,652 | 4/1963 | Smith, Jr. | 141/134 X |
| 3,152,010 | 10/1964 | Case | 107/43 X |
| 2,970,563 | 2/1961 | Hunter | 107/43 X |

Primary Examiner—Frank L. Abbott
Assistant Examiner—Sam D. Burke
Attorney—Hume, Clement, Hume & Lee

[57] ABSTRACT

An apparatus and method are provided for continuously applying a pizza topping material to a plurality of pizza shells by transmitting pizza shells along a conveying assembly, passing the shells beneath a curtain of topping material falling from a shaker platform, recovering excess topping material which falls in the spaces between the pizza shells, recirculating excess topping material to a supply chute where excess topping material is mixed with fresh topping material, controlling the flow of excess and fresh topping materials in the supply chute with an electric eye, adjusting the flow of fresh topping material into the supply chute, and transmitting combined material to the shaker platform.

8 Claims, 4 Drawing Figures

Patented March 14, 1972

INVENTOR
SANTO ZITO

BY HUME, CLEMENT,
HUME & LEE

ATTORNEYS

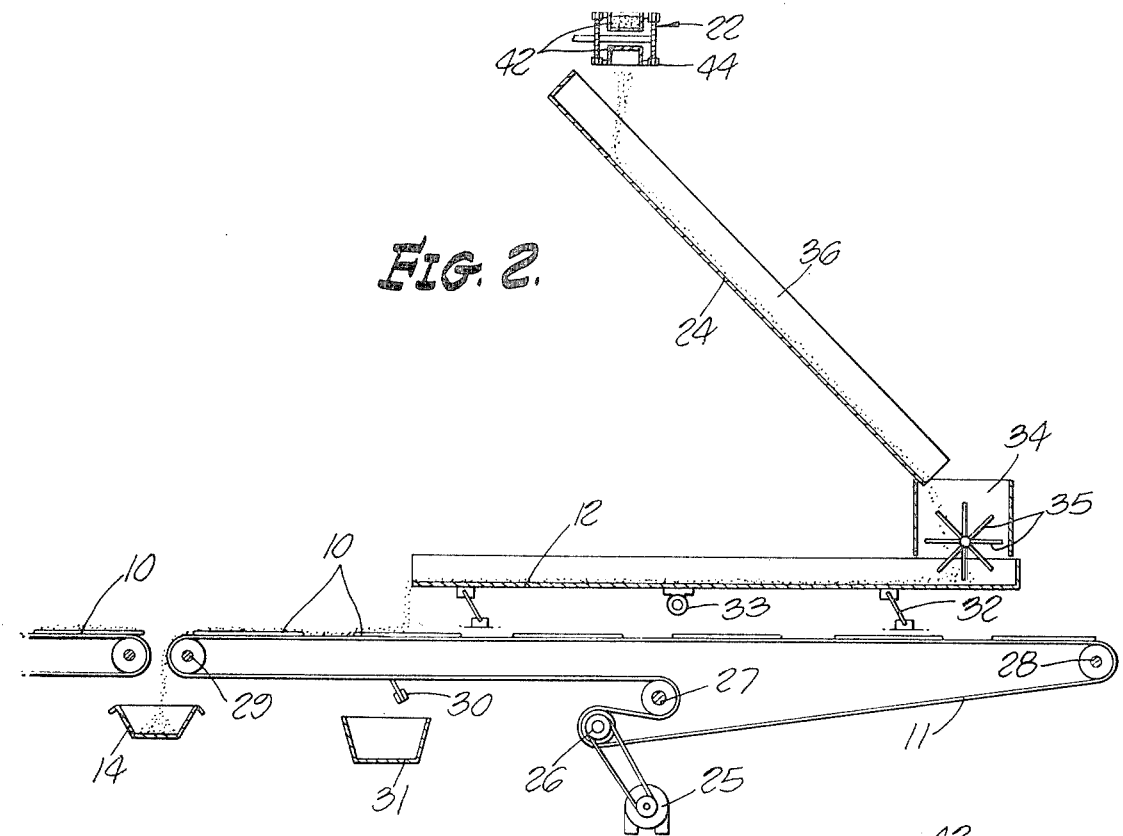
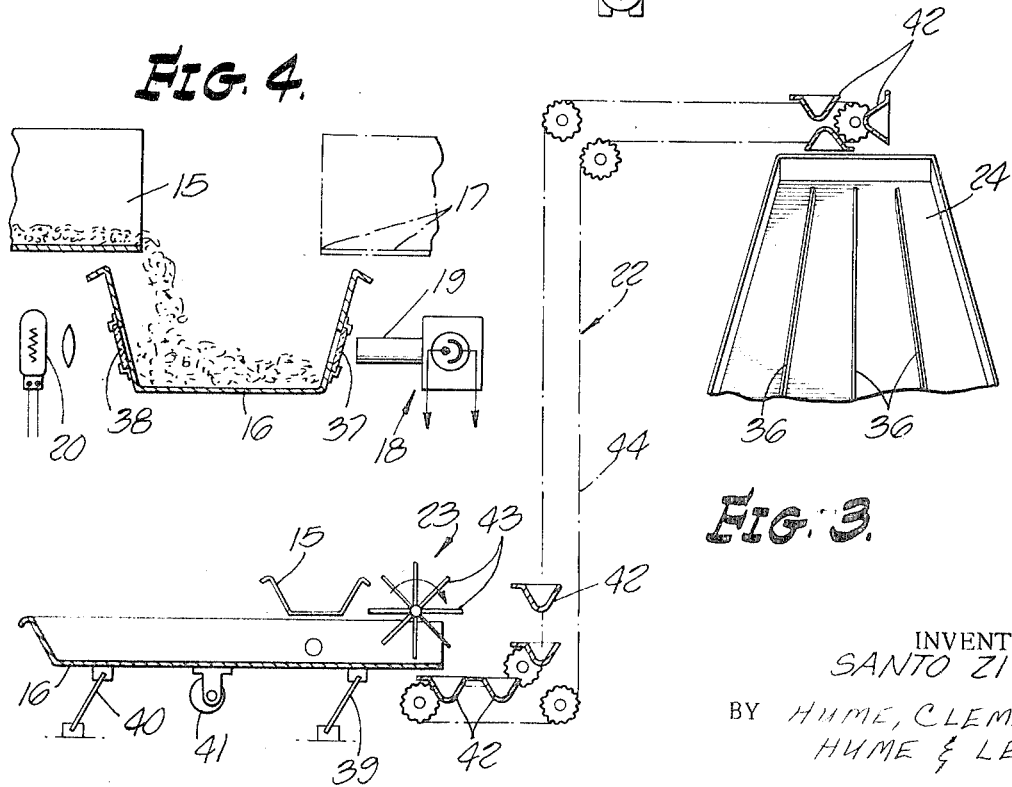

3,648,596

PIZZA-TOPPING APPARATUS

BACKGROUND OF THE INVENTION

This invention relates to an apparatus and method for automatically applying fixed quantities of variably shaped and sized coating materials to a plurality of objects. More particularly, this invention concerns an apparatus and method for automatically applying a traditional pizza topping material made up of chopped meat, ground pepperoni, ground sausage, shredded cheese, and the like, to a plurality of pizza shells or crusts in a manner in which the distribution and quantity of topping material is accurately controlled.

Two types of mechanical devices have been used in the past to accomplish the application of pizza topping materials to pizza crusts. A first type of pizza-topping apparatus employs an indexing drive assembly which intermittently moves uncoated pizza crusts into positions beneath a rotating nozzle; the nozzles then apply a suitable amount of topping material to the upper surface of the crusts. Typically, indexing type devices require complex and expensive components which vastly reduce the output capability of the overall pizza-topping operation. In addition, it is sometimes difficult to control the quantity and distribution of topping material when an indexing-type apparatus is used.

A second device used to apply topping material to pizza crusts utilizes a vibratory feed apparatus that permits topping material to flow onto a stationary crust or which utilizes a series of narrow vibrators to apply topping material to pizza crusts moving in single file type arrangement beneath the vibrating apparatus. Besides providing large scale waste of topping material, vibratory feed devices normally restrict the flow of topping material, limit the output of finished pizzas, result in a nonuniform application of topping material, and are incapable of accurate control of the quantity and distribution of topping material on the surface of the pizza crusts. In addition, the size of the individual pizza crusts which can be handled by vibratory-type feed devices is greatly reduced.

SUMMARY OF THE INVENTION

In contrast with the prior art, the apparatus and method of this invention provides an easy and efficient technique for accurately and automatically applying a controlled quantity of pizza topping material to a plurality of shells or crusts. A general configuration for one form of the apparatus used in this invention includes: a vibratory shaker platform which is adapted to provide a curtain of falling topping material onto the pizza crusts; an assembly for continuously transmitting a plurality of pizza crusts beneath the shaker platform; an inclined distribution chute disposed above the shaker platform and adapted to supply topping material to the shaker platform; a supply assembly for containing a fresh supply of topping material; a conveying assembly to transmit topping material from the supply assembly to the inclined distribution chute; a recirculating assembly for receiving excess topping material not deposited on the pizza crusts and for transmitting excess topping material to the conveying assembly; and a control assembly for adjusting the volumetric flow of combined fresh and excess topping material to the conveying assembly.

In addition, this invention provides a method for applying a topping material to a plurality of pizza crusts having different sizes and shapes. One embodiment of the method of this invention involves the continuous transmission of a plurality of pizza crusts along a horizontal belt. The pizza crusts are then passed beneath a curtain of falling topping material, which moves along the shaker platform and falls onto the crusts.

Excess topping material falling in the spaces between the pizza crusts is first recovered and recirculated to a supply chute where excess topping material and fresh topping material are mixed. The flow of combined excess and fresh topping material into a supply chute is controlled by first determining the level of combined topping materials in the supply chute and adjusting the flow of the fresh topping material into the supply chute. Finally, the combined topping materials are transmitted to the platform for eventual distribution onto the pizza crusts passing below.

By using the apparatus and method of this invention, one can accurately and automatically apply controlled quantities of pizza topping material to a plurality of pizza crusts having a wide variety of shapes and sizes. In addition, the pizza crusts can move continuously through the processing system at relatively high speeds to provide quick and accurate pizza production capability.

The entire operation of the apparatus and method of this invention can be carried out without the necessity of manually handling the topping material during processing. In addition, a vast reduction in the overall waste of topping material results from the recirculating characteristics of the invention. The use of a controlled falling curtain of topping material, likewise, provides highly uniform toppings on a variety of differently shaped pizza crusts without sacrificing the high through-put capability needed in automated pizza-making machines.

The apparatus and method of this invention are also highly flexible in their operational characteristics. For example, the apparatus can be used with a variety of topping materials, such as shredded cheese, ground sausage, ground pepperoni, and ground cooked hamburger, each of which, of course, have vastly different physical properties. Moreover, by varying the weight of topping material loaded into the bucket conveying assembly, the speed of the bucket assembly, the speed and action of the vibratory shaker platform, and the speed of the pizza crust conveying assembly, a precise amount of topping material can be deposited on the pizza crusts passing through the curtain of topping material. Thus, the apparatus and method of this invention have overcome the difficult problem of accurately controlling the flow of pizza topping materials with a minimum of expensive and complex machinery.

BRIEF DESCRIPTION OF THE DRAWINGS

This invention will be better understood by reference to the following drawings in which:

FIG. 2 is a partial end elevational view of the shaker platform, distribution chute, rotary spreader, bucket conveyor assembly, and pizza conveyor assembly shown in cross section through line 2—2 of FIG. 1;

FIG. 3 is a partial end elevational view of the topping feed assembly with the supply chute, rotary spreader, and bucket conveyor shown in cross section taken through line 3—3 of FIG. 1; and FIG. 4 is a cross sectional view through line 4—4 of FIG. 1 showing the supply hopper discharging fresh topping material into the supply chute and the transfer chute discharging excess topping material into the supply chute. Also shown is an electric eye assembly used to detect the level of combined topping materials in the supply chute.

DESCRIPTION OF THE PREFERRED EMBODIMENT

Figure 1:
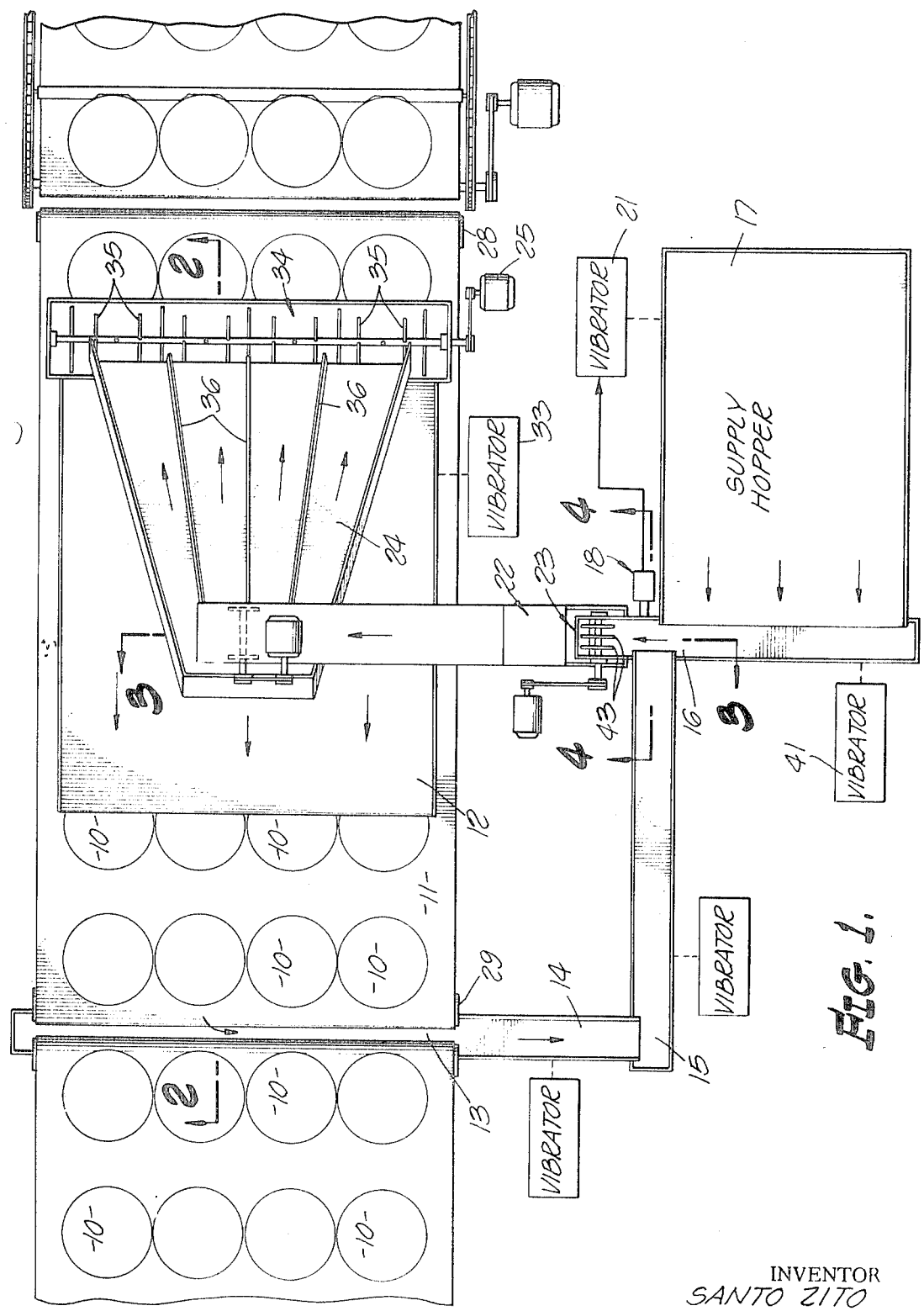
FIG. 1 is a plan view of one form of the pizza topping apparatus of this invention.

Referring now to the drawings, FIG. 1 illustrates the general overall configuration of one embodiment of this invention. As can be seen in FIG. 1, a plurality of pizza crusts 10 are carried on belt conveying assembly 11. The uncoated crusts 10 pass below the discharge end of a vibratory shaker platform 12 where the topping material is continuously sprinkled over the crusts. Excess topping material falling in the spaces between adjacent crusts drops through opening 13 in the rotating belt assembly as the coated pizza crusts move along the assembly. This excess topping material falls into a first vibrating chute 14 and then is passed into a vibrating transfer chute 15 which serves to interconnect chute 14 with vibratory supply chute 16.

In supply chute 16, fresh topping material discharging from main supply hopper 17 is mixed with the recirculating excess topping material from transfer chute 15. As the flow of excess topping material from transfer chute 15 changes, electric eye control assembly 18 composed of light source 19 and detection device 20 automatically senses level changes in the supply chute and activates the vibratory mechanism 21 of main supply hopper 17 to accommodate the changing level of topping material in supply chute 16. In this way, a controlled amount of combined topping material always flows to bucket conveying means 22.

Before the combined topping material is transferred to the plurality of buckets on bucket conveying means 22, it is passed through counterrotating rotary spreader 23 which tends to break the topping material into a number of pieces and at the same time, control the maximum amount of topping material discharging into the buckets on bucket-conveying means 22. Then the topping material is transmitted by bucket-conveying means 22 to the raised end of inclined distribution chute 24. Finally, the topping material flows down the distribution chute, through rotary spreader 34 and onto the vibratory shaker platform 12 to complete the entire cycle of the apparatus.

Referring now more particularly to FIGS. 2, 3, and 4, it can be seen that main supply hopper 17 is located at floor level and is adapted to receive a large supply of fresh topping material. When the base of the supply hopper is vibrated, topping material is discharged from the supply hopper into a supply chute 16 and subsequently moved in the direction of bucket conveyor assembly 23 for eventual deposit on distribution chute 24.

Belt conveyor assembly 11, driven by a motor assembly 25, is used to support a plurality of pizza crusts which move continuously along the belt. Pulley 26 is driven by motor assembly 25, and as pulley 26 rotates, it in turn rotates pulleys 27, 28, and 29, which serve to continuously rotate belt 11. A stripper 30 is provided at the base of the rotating belt conveyor to scrape topping material which clings to the belt. This waste material is then collected in waste bin 31.

Thus, in accordance with this invention, a curtain of falling topping material is provided by the vibratory action of shaker platform 12. Topping material flows along the Teflon-coated, vibratory shaker platform 12 onto the pizza crusts 10 passing below at varying rates, depending upon the amount of external vibration applied by eccentric motor driven vibrator 33. At the same time, excess topping material falling between the spaced pizza crusts discharges through opening 13 in belt conveyor assembly 11 for eventual recirculation back to supply chute 16.

From FIG. 2, it can be seen that vibratory shaker platform 12 is flexibly suspended on adjustable suspension means 32. The flow of topping material along the shaker platform is assisted by means of eccentric, motor-driven vibratory mechanism 33, which assists the flow of the topping material and can be readily adjusted to accommodate a variety of topping materials having different flow properties. At the same time, the shaker platform surface is coated with a smooth material such as Teflon to further assist the uniform flow of topping material along the shaker.

Rotary spreader 34 located at the feed end of the shaker platform is provided with a plurality of rotating fingers 35, adapted to break any large pieces of topping material and to assist in the even distribution of topping material over the surface of the shaker platform.

Inclined distribution chute 24 is positioned above the shaker platform and is arranged so that the lower end of the distribution chute coincides with the feed end of the shaker platform. As illustrated in FIG. 3, the distribution chute is provided with a plurality of longitudinally spaced ribs 36 which further help to maintain an even distribution of topping material as it flows down the inclined distribution chute toward rotary spreader 34 and shaker platform 12. The angle by which distribution chute 24 is offset from a horizontal orientation is sufficient to provide gravity flow of topping material down the chute without clogging or plugging the chute with topping material.

The discharge of fresh topping material from main supply hopper 17 is controlled by means of electric eye control assembly 18 and rotary spreader 23. Since the quantity of recirculated, excess topping material discharged from transfer chute 15 can vary, the use of light source 19 and detection device 20, allows the easy determination and control of the total amount of combined topping materials discharged into bucket conveyor assembly 22.

Detection and control of combined topping materials are accomplished as follows. Supply chute 16 is provided with a pair of windows 37 and 38 on each of its sidewalls corresponding to the positions of light source 19 and detection device 20. The control assembly determines the level of topping material in supply chute 16, which, of course, will necessarily be a function of the volume of excess topping material discharged by transfer chute 15. As the level of topping material drops below some predetermined value, the control mechanism activates the vibratory mechanism 21 in main supply hopper 17 and thus causes discharge of fresh topping material into supply chute 16. Although the total output of combined topping materials from supply chute 16 is controlled by the electric eye, e.g., light source 19 and detection device 20, the speed of vibration and slope of the supply chute is fixed by means of adjustable lever arms 39 and 40 and vibratory mechanism 41.

Rotary spreader 23 interposed between bucket conveying assembly 22 and supply hopper 17 tends to maintain a maximum volumetric flow of combined topping materials to the bucket conveying assembly by means of counterrotating fingers 43, which rotate in a direction opposite to the direction of flow of the combined topping materials. Consequently, the volume of topping material in supply chute 16 is essentially controlled by the coaction of electric eye assembly 18, which controls the minimum level of topping material in supply chute 16, and rotary spreader 23, which controls the maximum level of topping material in the supply chute.

Ultimately, however, the rate of supply of a unit volume of topping material from shaker platform 12 is a function of the rate of vibration of supply chute 16, assuming the other flow control mechanisms in the system, such as the rate of vibration of platform 12, are operated at a constant rate. Accordingly, by adjusting the vibration rate of supply chute 16, the final discharge rate of topping material on the pizza crusts can be closely controlled. It will be recognized that, in addition, significant flexibility is provided by the apparatus and method of this invention, since a precise amount of topping material can be deposited on pizza crusts of various sizes and shapes by simply regulating the vibration rate of supply chute 16, the vibration rate of shaker platform 12, and the speed of belt 11 passing through the curtain of falling topping material. As a result of this flexibility, the apparatus can be used with a wide variety of topping materials having vastly different sizes, shapes, and flow characteristics.

Before topping material is passed from supply chute 16 into buckets 42, it is passed through a rotary spreader 23, which is equipped with a plurality of rotating fingers 43. Normally, the fingers 43 are rotated against the direction of flow of topping material. This provides a continuous raking action, which tends to break the topping material into its individual pieces, a condition the topping material may have lost through the compression of storage. The fingers also assist in maintaining a constant level of material in the supply chute 16 by leveling the topping material as it passes under the rotary spreader.

After passing through rotary spreader 23, topping material is deposited in buckets 42, which in turn are carried by belt 44 to the top portion of distribution chute 24 where the buckets discharge topping material onto the raised end of the distribution chute.

In a typical operation, pizza crusts of various sizes can be passed under the curtain of falling topping material at a processing rate of 280 pizzas per minute. Tests have shown that the weight of topping material can be adjusted to about 0.25 ounce to topping per pizza to about 16 ounces of topping per pizza while maintaining highly accurate weight control within the range of a 5 percent variation of the predetermined desired weight of topping material. Thus, it is clear that the apparatus and method of this invention provide a high degree of control and overall flexibility for a wide variety of topping materials.

I claim:

1. An apparatus for applying pizza topping material to a plurality of pizza shells which comprises:
    deposition means for providing a curtain of falling topping material for application onto a plurality of pizza shells;
    means for transmitting a plurality of spaced pizza shells through said curtain of falling topping material;
    supply means for containing fresh topping material;
    conveying means for transmitting said topping material from said supply means to said deposition means;
    recirculating means for collecting the excess topping material falling between the pizza shells and for transmitting said excess topping material to said conveying means; and
    control means for regulating the volumetric flow of topping material to be furnished to said deposition means, said control means including:
    spreader means interposed between said supply means and said conveying means for maintaining a maximum volumetric flow of combined topping materials to said conveying means; and
    sensing means which determines the volume of combined topping materials flowing in the direction of said spreader means, and which adjusts the flow of fresh topping material from said supply means to said conveying means.

2. An apparatus as defined in claim 1 wherein said spreader means comprises a rotary spreader having a plurality of finger adapted to rotate in a direction opposite the direction of flow of the combined excess and fresh topping materials.

3. An apparatus as defined in claim 1 wherein said deposition means comprises:
    a vibratory shaker platform adapted to provide a curtain of falling topping material onto said pizza shells; and
    an inclined distribution chute disposed above said shaker platform and adapted to supply topping material to said shaker platform.

4. An apparatus as defined in claim 1 wherein the rate of flow of topping material along said shaker platform is adjusted by vibratory means secured to said shaker platform.

5. An apparatus as defined in claim 4 which is further characterized by a rotary spreader means interposed between said shaker platform and said inclined distribution chute, said rotary spreader means having a plurality of rotating fingers adapted to break the topping material flowing from said distribution chute onto said shaker platform into a plurality of pieces.

6. An apparatus as defined in claim 1 wherein said means for transmitting said pizza shells has an opening to permit undeposited excess topping material to flow into said recirculating means and wherein said supply means is connected to a vibratory supply chute which interconnects said supply means and said conveying means.

7. An apparatus as defined in claim 6 wherein said recirculating means has a first vibratory chute positioned beneath the opening in said means for transmitting said pizza shells and is adapted to receive excess topping material from said opening; and wherein a second vibratory chute interconnects said first chute and said vibratory supply chute and is adapted to transmit excess topping material from said first chute to said vibratory supply chute.

8. An apparatus as defined in claim 7 wherein said control means includes an electric eye which first determines the combined volume of excess topping material discharging from said second vibratory chute and fresh topping material discharging from supply means and which then controls the flow of fresh topping material to permit substantially constant flow of combined topping materials to said conveying means.

* * * * *